May 23, 1933.  L. MASLOW  1,910,302

EGG BEATER

Filed Dec. 12, 1930

WITNESSES

INVENTOR
Louis Maslow
BY
ATTORNEYS

Patented May 23, 1933

1,910,302

UNITED STATES PATENT OFFICE

LOUIS MASLOW, OF BROOKLYN, NEW YORK

EGG BEATER

Application filed December 12, 1930. Serial No. 501,964.

An object of the invention is to provide an egg beater which is durable in construction and which is inexpensive to manufacture.

Another object of the invention is to provide an egg beater having a base from which extends a plurality of loop members, one of the loop members having means for holding the other loop members in position at a distance from the base.

Still another object of the invention is to bend one of the loop members at a distance from the base to form a neck through which the other loop members are disposed and by which the said other loop members are held in operative position.

Additional objects of the invention will appear in the following specification in which the preferred form of the invention is described.

Figure 1:
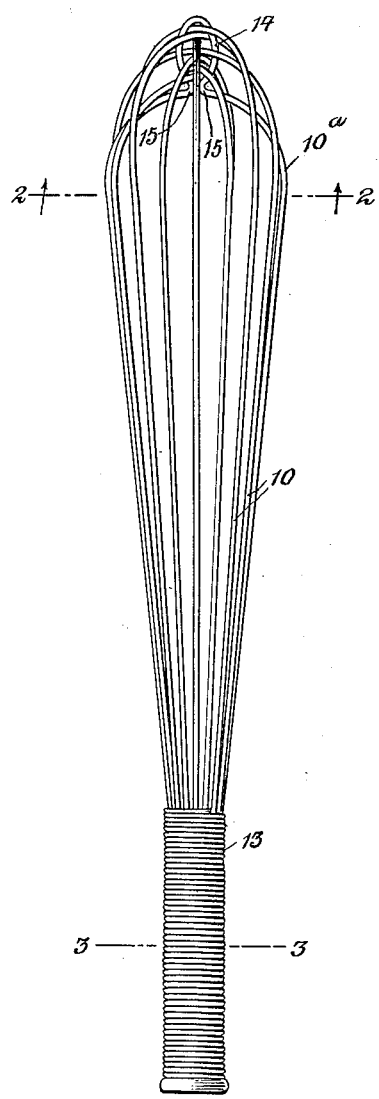
Figure 2:
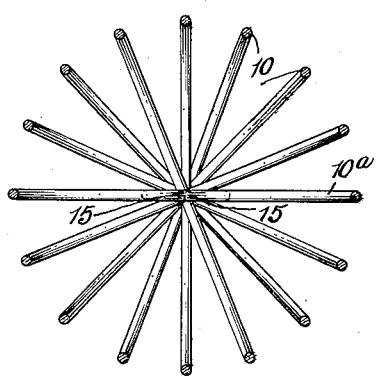
Figure 3:
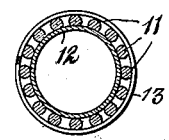

In the drawing similar reference characters refer to similar parts in the several views, of which Figure 1 is a side elevation showing the egg beater which is the subject matter of this application, Figure 2 is an enlarged sectional view on the line 2—2 of Figure 1, and Figure 3 is an enlarged sectional view on the line 3—3 of Figure 1.

It has been the practice to secure the ends of the loop members of egg beaters together by tying or otherwise securing them by a separate wire or other member. With the hard usage to which egg beaters are subjected these wire or other securing members become loose or broken and parts become hidden in the substance which is being beaten, with the result that the broken parts are passed on and become disposed in the food which is being prepared. The breaking down of the wire or other securing members also renders the egg beater of little value and it is consequently discarded and a new egg beater is purchased. With the egg beater which is the subject matter of this application these objections are overcome, inasmuch as one of the loop members with its terminals secured in the base has a bent portion forming a neck through which the other loop members are disposed and by which means all the loop members are secured together.

By referring to the drawing it will be seen that the egg beater is provided with a number of loop members 10 which may be manufactured of wire. The loop members 10 have terminals 11 spaced apart around a circular core 12, the terminals 11 of each loop member 10 being disposed diametrically opposite each other. The terminals 11 of the loop members 10 are bound against the circular core 12 by means of a wire 13 which is wound around the terminals 11 of the loop members 10, as illustrated in Figure 1 of the drawing. The terminals of the wire 13 are preferably soldered to the loop members 10 and to the circular core 12.

It will be seen by referring to Figure 1 that the loop members 10 are of different lengths and that at their outer ends they cross each other, as illustrated in Figure 2. The loop member $10^a$ has a portion 14 which is bent to encircle the other loop members 10, which serves to hold all the loop members 10 relatively to each other at their outer ends. In the construction illustrated in Figure 1 the sides of the portion 14 of the loop members $10^a$ are bent together at 15 between the ends of the other loop members and the base consisting of the circular core 12 and the wound wire 13, so that the other loop members 10 are encircled by the said portion 14 of the loop member 10, which serves to hold the outer ends of all the loop members together without the necessity of using other wire or securing means.

What is claimed is:—

1. In an egg beater, a plurality of looped members each having terminals, means for holding the terminals relatively to each other, one of the looped members extending beyond the ends of the other looped members and having its sides bent in the direction of each other adjacent the ends of the said other looped members for enclosing and holding the looped members and permitting limited movement of the looped members relatively to each other.

2. A whip comprising a handle portion and a whipping portion, the whipping portion comprising a plurality of wire members projecting from the handle portion, each wire member being bent back upon itself, the wire ends being received in the handle portion, one of the wire members having a loop formed in the bent portion, said loop serving to receive the other wire members therethrough and hold all the wire members in substantial alignment with each other.

3. A whip comprising a base and a whipping portion, the whipping portion comprising a plurality of wire members projecting from the base, each wire member being bent back upon itself, the ends of the wire members being received in the base, one of the wire members having a loop formed in the bent portion, the said loop serving to receive the other wire members therethrough and hold all the wire members together at their bent portions.

LOUIS MASLOW.